United States Patent [19]

Rigsby

[11] Patent Number: 5,113,618
[45] Date of Patent: May 19, 1992

[54] PROTECTOR FOR PLANT GROWING RECEPTACLE

[76] Inventor: Robert Rigsby, P.O. Box 05865, Fort Myers, Fla. 33905

[21] Appl. No.: 699,654
[22] Filed: May 14, 1991
[51] Int. Cl.$^5$ ............................ A01G 9/02; A01G 27/00
[52] U.S. Cl. ............................................. 47/71; 47/71
[58] Field of Search ................. 47/71, 72, 75; 135/97, 135/79, 80, 81, 82

[56] References Cited

U.S. PATENT DOCUMENTS

| | | | |
|---|---|---|---|
| D. 245,643 | 8/1977 | Orfei | 47/71 |
| 1,778,175 | 10/1930 | Thune | 47/71 |
| 2,486,932 | 11/1949 | Elliott | 47/71 |
| 3,775,903 | 12/1973 | Pike | 47/37 |
| 4,014,506 | 3/1977 | Hanson | 47/72 |
| 5,007,135 | 4/1991 | Rigsby | 47/66 |

Primary Examiner—David A. Scherbel
Assistant Examiner—Joanne C. Downs
Attorney, Agent, or Firm—Brady, O'Boyle & Gates

[57] ABSTRACT

A protector for a plant growing receptacle wherein a large container receives a relatively small container so that a space is provided between the walls of the container and plant growing receptacle to form a combined water reservoir for collecting run-off rain and irrigation water, and a catch basin for collecting fertilizer leach run-off flowing from the plant growing receptacle. A portion of the container wall is provided with a heat reflecting surface, and another portion of the container wall is provided with a heat absorbing surface. A brace extends across the open end of the container for stabilizing the plant in the receptacle.

6 Claims, 1 Drawing Sheet

PROTECTOR FOR PLANT GROWING RECEPTACLE

CROSS-REFERENCE TO RELATED APPLICATIONS

The protector of the present invention is of similar construction to the plant growing receptacles disclosed in my pending patent applications Ser. No. 07/539,885, filed Jun. 18, 1990, and Ser. No. 07/653,673, filed Feb. 11, 1991.

BACKGROUND OF THE INVENTION

The plant growing receptacles disclosed in my above-identified pending applications include a receptacle having an open top, a closed bottom wall and at least one opening provided in the receptacle side wall at a distance above the bottom wall. A mixture of soil and fertilizer is placed within the receptacle to promote further growth of the plant therein so that when water is fed to the upper portion of the receptacle, some of the water, soil and fertilizer gravitates to the bottom of the receptacle to form a slurry; thus providing a moist environment within the receptacle, the opening in the receptacle side wall forming a root exit and drain opening.

The plant growing receptacle can be placed at an in-soil planting position, or at an above-ground position wherein the bottom of the receptacle rests on the ground. At the above-ground position, the plant growing receptacle is more exposed to the atmospheric elements than when placed at the in-soil planting position. For instance, during hot weather, the sun shining on the plant growing receptacle results in high temperatures in the slurry causing root shock and water evaporation, and during cold weather, low temperatures being transmitted through the receptacle walls can also cause root shock, and blowing wind can cause the plant growing receptacle to tip over.

SUMMARY OF THE INVENTION

After considerable research and experimentation, the plant container protector of the present invention has been devised to not only protect the plant growing receptacle from the summer heat, the winter cold and the blowing wind, but also, to provide a water reservoir for the plant growing receptacle, a catch basin for the fertilizer run-off from the receptacle, a barrier to prevent the plant growing in the receptacle from rooting into the ground or soil, and a stabilizer for the plant in the receptacle.

The plant container protector of the present invention comprises, essentially, a large, plastic container having an open top, a closed bottom wall, and a side wall having an opening provided therein at a position above the closed bottom wall in proximity thereto. A portion of the side wall of the container is provided with a heat reflective surface, and another portion of the container side wall is provided with a heat absorbing surface. Recesses are formed in the upper edge portion of the container side wall for receiving the opposite end portions of a brace. The width of the container is larger than the width of the plant growing receptacle so that when the plant growing receptacle is placed in the container, a space is provided between the side walls of the receptacle and container, to thereby provide a water reservoir for the receptacle, and a catch basin for the fertilizer leach run-off from the receptacle.

During the summer, the container, with the plant growing receptacle placed therein, is oriented so that the heat reflective surface faces the sun, to thereby insulate the receptacle from the sun's heat; and during the winter, the container is oriented so that the heat absorbing surface faces the sun, whereby the sun's heat is absorbed by the container and transmitted to the receptacle.

DESCRIPTION OF THE PREFERRED EMBODIMENT

Figure 1:
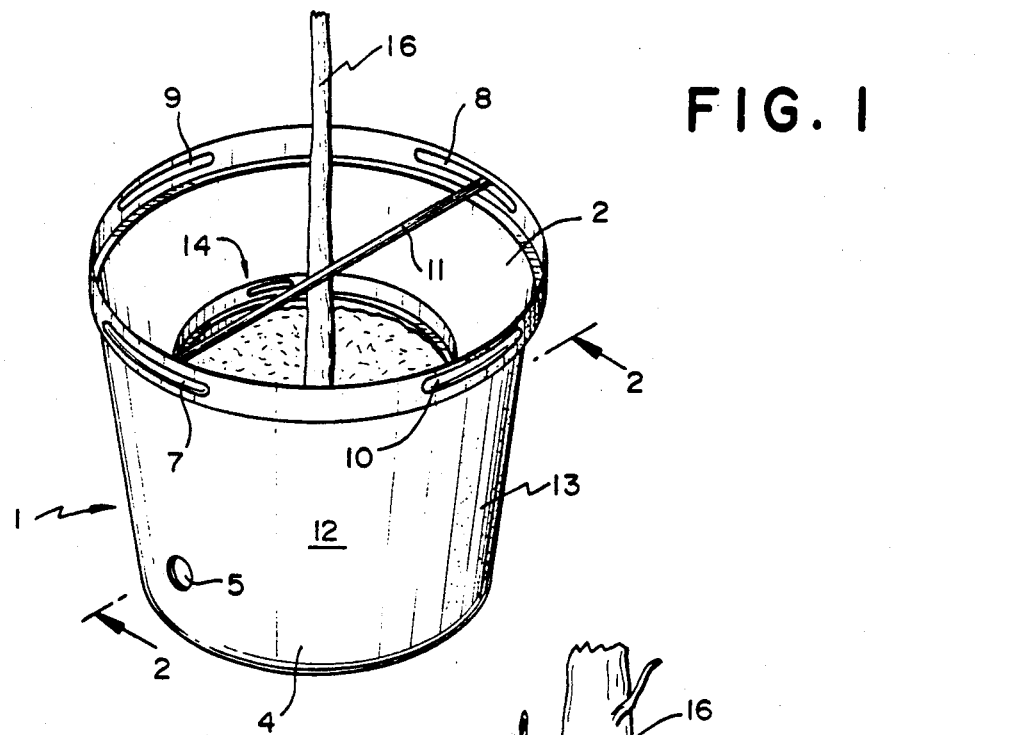
FIG. 1 is a perspective view of the protector of the present invention having a plant growing receptacle positioned therein.

Referring to the drawing, the protector of the present invention comprises a large, plastic container 1 having an open top 2, a closed bottom wall 3, and a side wall 4 having a plurality of openings 5, 6 provided therein in proximity to the bottom wall 3.

The upper edge portion of the container 1 is provided with a plurality of circumferentially spaced recesses 7, 8, 9 and 10 for selectively receiving opposite ends of a brace in the form of a stick or rod 11.

As will be seen in FIG. 1, one portion of the container side wall 4 is provided with a suitable heat reflecting surface 12, and another portion of the container side wall is provided with a suitable heat absorbing surface 13. The respective surfaces may be white and black in color either painted on the container side wall or integrally molded therein with the container.

Figure 2:
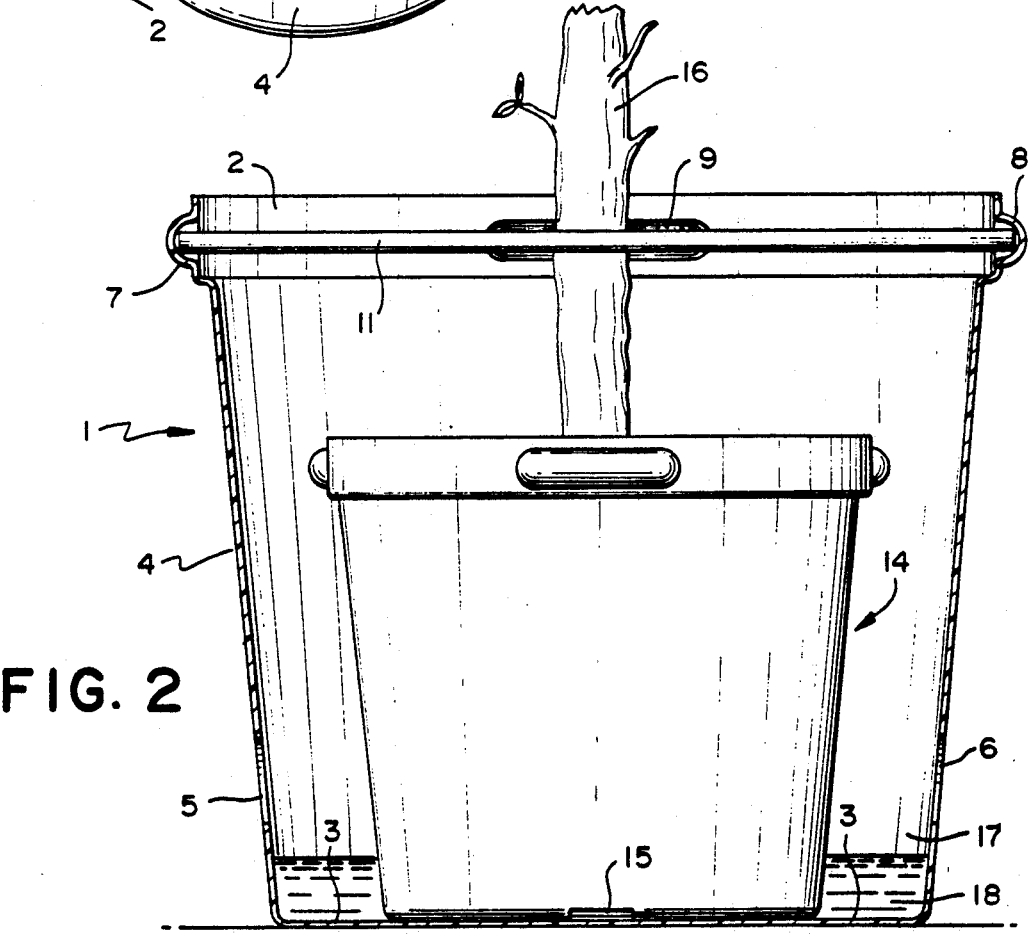
FIG. 2 is a view taken along line 2—2 of FIG. 1.

In use, a conventional plant growing receptacle 14 having an opening 15 in the bottom wall thereof is placed in the container 1, and, if needed, the brace 11 is mounted as shown to support or stabilize the trunk or main branch 16 of the plant. As will be seen in FIG. 2, the width or diameter of the container 4 is somewhat larger than the diameter of the receptacle 14, whereby a space 17 is provided between the side walls of the receptacle and container, to thereby form a combined water reservoir and catch basin 18 for the receptacle. By this construction and arrangement, a certain amount of run-off water from rain or an irrigation system can be caught and stored in the reservoir 18 to be absorbed by the plant in the receptacle through the opening 15, and some of the fertilizer leach run-off flowing through the receptacle drain opening 15 will be caught in the basin 18 which will result in less environmental pollution. The drain openings 5 and 6 in the container side wall determine the amount of run-off water to be retained in the reservoir 18.

During the summer, the container 1 with the plant growing receptacle 14 placed therein is oriented so that the heat reflective surface 12 faces the sun, and during the winter, the container 1 is turned so that the heat absorbing surface 13 faces the sun.

From the above description, it will be appreciated by those skilled in the art that the protector of the present invention not only protects the plant growing receptacle from the summer heat, the winter cold and the blowing wind, but it also provides a water reservoir for the plant growing receptacle, a catch basin for the fertilizer leach run-off from the receptacle, a barrier to prevent the plant, growing in the receptacle, from rooting into the ground or soil, and a stabilizer for the plant in the receptacle.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A protector for a plant growing receptacle comprising a container having an open top, a closed bottom wall and a side wall, a plant growing receptacle having a bottom wall and a drain opening in said bottom wall placed in said container with the bottom wall of the receptacle resting on the closed bottom wall of the container, the container having a greater height and width than the receptacle, whereby the top edge of the container extends a substantial distance above the top edge of the receptacle, to thereby protect the plant from the summer heat, winter cold and blowing winds and a space is provided between the side walls of the container and the receptacle, to thereby form a combined water reservoir and catch basin for collecting run-off rain and irrigation water, and fertilizer leach run-off from the receptacle.

2. A protector according to claim 1, wherein a portion of the container side wall is provided with a heat reflecting surface, and another portion of the container side wall is provided with a heat absorbing surface, whereby during the summer the container is oriented so that the heat reflecting surface faces the sun, and during the winter the container is oriented so that the heat absorbing surface faces the sun.

3. A protector according to claim 1, wherein a plurality of recesses are formed in the upper portion of the side wall of the container, and a brace having opposite end portions mounted in a respective recess extending across the open top of the container and abutting the trunk of the plant in the receptacle to thereby stabilize the plant.

4. A protector according to claim 1, wherein an opening is provided in the side wall of the container at a position above the closed bottom wall in proximity thereto, whereby a certain amount of run-off water is collected in the reservoir.

5. A protector for a plant growing receptacle comprising a container having an open top, a closed bottom wall and a side wall, the container adapted to receive a plant growing receptacle and having a width greater than the width of the plant growing receptacle, a portion of the side wall of the container having a heat reflecting surface and another portion of the side wall of the container having a heat absorbing surface.

6. A protector according to claim 5, wherein brace means extends across the open top of the container adapted to stabilize the main branch of a plant in the receptacle.

* * * * *